United States Patent Office 3,663,718
Patented May 16, 1972

3,663,718
PROCESS FOR PREPARING CHOCOLATE
FLAVORED BANANA POWDER
Robert H. Bundus, Riverside, Ill., assignor to Beatrice
Foods Co., Chicago, Ill.
No Drawing. Continuation-in-part of application Ser. No. 652,709, July 12, 1967. This application Oct. 13, 1970, Ser. No. 80,505
Int. Cl. A23b 7/02; A23l 1/27
U.S. Cl. 99—204        5 Claims

ABSTRACT OF THE DISCLOSURE

Chocolate flavored banana powder is prepared by co-drying a mixture of banana puree and cocoa. The product is less hygroscopic than the original banana solids. Desirably sugar is included in the composition.

---

This application is a continuation-in-part of U.S. application Ser. No. 652,709, filed July 12, 1967.

The present invention relates to a novel banana product.

It has recently been proposed to prepare dried banana powder, Aguirre Pat. 3,259,508, July 5, 1966. The entire disclosure of Aguirre is hereby incorporated by reference.

When an attempt is made to mix dry banana powder and cocoa stratification results unless the banana powder is very finely ground. Unfortunately finely grinding makes banana powder extremely hygroscopic and enhances its tendency to cake. In fact banana powder even without grinding is hygroscopic and tends to cake. Stratification is undesirable since the resulting product is not uniform and products produced therefrom such as flavored food and dairy products e.g. ice cream, milk drinks, and milk shakes and like products, are likewise nonuniform.

It is accordingly an object of the present invention to prepare a low hygroscopicity uniformly dispersed cocoa/banana powder.

Another object is to prepare a novel cocoa-banana product.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by mixing cocoa (pulverized partially defatted ground cocoa nibs) with banana puree and codrying the mixture. The banana puree can have 5 to 70% solids by weight. The cocoa is 5 to 50%, usually 15 to 25% of the total dry weight of cocoa and banana and is preferably at least 19% of such dry weight.

By drying the mixture of cocoa and banana puree there is obtained an intimate mixture which does not separate or stratify. The resulting product also is less hygroscopic than the original banana solids. The product is useful for flavoring milk, skim milk or other beverages, ice cream or baked goods. When mixed with sugar it can be used as a sweet goods item by itself. The flavored products noted above are also more uniform and non-stratifying than similar products heretofore available.

The term "cocoa" used herein is defined according to the standard definition in the art and is not intended to embrace uninformed or loose definition thereof. Hence, the term "cocoa" is defined as: a food prepared by pulverizing the residual material remaining after part of the cocoa fat has been removed from ground cocoa nibs and wherein the product contains less than 22% by weight of cocoa fat. Therefore, the cocoa useful in the present invention must be partially defatted cocoa nibs, i.e. less than 22% cocoa fat as noted above, and whole or ground cocoa nibs are not useful since a product obtained therewith, due to excess fat, will not provide the present superior product or result in acceptable properties of food products, as noted above, and especially milk shakes and like dairy products. However, the term "cocoa" is intended to embrace both varieties of "cocoa," i.e. the medium fat and low fat cocoa, the former having less than 22% but not less than 10% by weight of cocoa fat and the latter having less than 10% by weight of cocoa fat.

The cocoa can be added to the banana puree before or after pasteurization of the latter. Preferably the process is carried out continuously with the cocoa and raw banana puree being separately metered into the mixing chamber.

While the cocoa can be added dry it is preferably continuously pumped as an aqueous dispersion into the banana puree, dispersed therein and dried. While various drying techniques can be employed, the preferred procedures are drum drying and roller drying. As explained in Aguirre a small amount of an antioxidant, i.e. 0.15 to 0.50% of ascorbic acid on the dry weight of the bananas can be added to the banana puree.

Unless otherwise indicated all parts and percentages are by weight.

Pasteurization can be carried out at conventional times and temperatures, e.g. 145–160° F. for up to 30 minutes but is more preferably carried out at higher temperatures, e.g. 225 to 300° F. for 60 to 0.3 seconds. Homogenization can be accomplished simultaneously with pasteurization or can be done separately.

EXAMPLE I

Bananas were peeled. The raw banana meat was macerated on a high sheer machine specifically an extrusion plate provided with perforation through which the banana substance was pressed into a shapeless, pulpy mass. The maceration step was carried out in a closed chamber followed by deaeration in a vacuum chamber.

The deaerated mixture was homogenized at 2000 p.s.i. to form a puree of 25% solids. To this puree was added 30% solids of medium fat cocoa in water in an amount sufficient to provide 19% of cocoa based on the total of banana and cocoa on a dry basis. The additions of puree and cocoa were continuously introduced as separate streams into a mixing vessel. The mixture was then heated and agitated at 255° F. for 15 seconds to destroy enzymes and was then cooled to 80° F. The puree-cocoa mixture was then pumped through an elongated nozzle having a number of small openings and was delivered to the bight between the two rollers of a double drum drier. The rollers were maintained at 320° F. and were rotated at a speed sufficient to dry the puree-cocoa mixture to 3% moisture content by the time the dried puree was removed from the drums.

The puree-cocoa mixture entered the bight of the drums as a continuous stream and was deposited on the drums at a controlled thickness of 0.015 inch. The dried banana puree-cocoa mixture was removed from the drum surfaces by doctor blades. The hot films so prepared were stretched to some extent by passing within a cold, dry air blast at 65° F. The brittle film thus prepared was pulled under tension between a rotating reel and a wheel resting freely in suspended contact with the film on the reel. The brittle sheet was then passed into a screw conveyer which broke the sheet into small size particles.

The process employed was basically that described in the Aguirre patent and the same homogenizing, heating and drying conditions can be employed as in Aguirre.

The product thus prepared had a strong banana and slight chocolate taste and was uniform (non-stratified) and had reduced hygroscopicity as compared to a banana powder similarly prepared in the absence of cocoa.

EXAMPLE II

A product having a stronger chocolate flavor than that prepared in Example I was obtained by repeating the process of Example I but using sufficient cocoa to provide 25% cocoa solids on a dry basis. The product of Example II was uniform and had lower hygroscopicity than a banana powder similarly prepared in the absence of cocoa.

In order to prepare a product suitable for making a milk shake, for example there is added to the codried banana-chocolate sufficient sugar to provide a sweet product. Thus for 7 parts of dry banana-chocolate there is desirably added 12 to 35 parts of sugar. The sugar for example can be 60 to 85% of the total of sugar, banana and chocolate on a dry basis.

EXAMPLE III

A milk shake was prepared by adding 8 fluid ounces of milk to a dry mixture of 22 grams of sugar and 7 grams of a roller dried uniform mixture of 1.33 grams of cocoa and 5.67 grams of banana prepared in Example I. The milk shake was stable for over ½ hour.

EXAMPLE IV

The procedure of Example I was repeated with low fat cocoa and similar results were obtained. A milk shake according to the procedure of Example III was made with the product and similar results were obtained.

What is claimed is:

1. A process of preparing a nonstratified, dry banana-cocoa powder having reduced hygroscopic properties compared to dry banana powder itself comprising drying a banana pureee containing a minor amount of cocoa, said cocoa being defatted ground cocoa having less than 22% fat.

2. A process according to claim 1 wherein the cocoa is 15 to 25% of the dry weight of the product.

3. A process according to claim 2 wherein the cocoa is 19 to 25% of the banana and cocoa on a dry basis.

4. A process as claimed in claim 1 wherein sugar is added to the dried banana-cocoa powder to yield a product containing 60 to 85% sugar on the total of banana, cocoa and sugar on a dry basis.

5. A process as claimed in claim 2 wherein sugar is added to the dried banana-cocoa powder to yield a product containing 60 to 85% sugar on the total of banana, cocoa and sugar on a dry basis.

References Cited

UNITED STATES PATENTS

| 857,445 | 6/1907 | Clark | 99—23 |
|---------|--------|-------|-------|
| 2,000,533 | 5/1935 | Northcutt | 99—199 |

OTHER REFERENCES

Encyclopedia of Chem. Tech., vol. 5, p. 365.

NORMAN YUDKOFF, Primary Examiner

M. G. MULLEN, Assistant Examiner

U.S. Cl. X.R.

99—140